United States Patent [19]

Watanabe et al.

[11] Patent Number: 5,478,991
[45] Date of Patent: Dec. 26, 1995

[54] AIRCRAFT BAGGAGE MANAGING SYSTEM UTILIZING A RESPONSE CIRCUIT PROVIDED ON A BAGGAGE TAG

[75] Inventors: Atsushi Watanabe, Toyokawa; Tatsuya Hirata, Ichinomiya, both of Japan

[73] Assignee: Nippondenso Co., Ltd., Kariya, Japan

[21] Appl. No.: 194,337

[22] Filed: Feb. 8, 1994

Related U.S. Application Data

[62] Division of Ser. No. 903,972, Jun. 26, 1992, Pat. No. 5,313,052.

[30] Foreign Application Priority Data

Jun. 28, 1991 [JP] Japan .................... 3-158617

[51] Int. Cl.$^6$ .................................... G06F 15/20
[52] U.S. Cl. ................... 235/375; 235/380; 235/384
[58] Field of Search ......................... 235/375, 380, 235/384; 340/572; 283/80; 209/3.3

[56] References Cited

U.S. PATENT DOCUMENTS

| | | | |
|---|---|---|---|
| 177,407 | 5/1876 | Leavitt | 283/80 |
| 922,948 | 5/1909 | Portmore | 283/80 |
| 3,228,129 | 1/1966 | Gwinn | 283/80 |
| 3,438,489 | 4/1969 | Cambornac et al. | 209/576 |
| 3,648,838 | 3/1972 | Hiromura | 209/3.3 |
| 4,058,217 | 11/1977 | Vaughan et al. | 209/559 |
| 4,303,904 | 12/1981 | Chasek | 340/23 |
| 4,711,994 | 12/1987 | Greenberg | 235/375 |
| 4,918,296 | 4/1990 | Fujisaka | 235/380 |
| 4,974,166 | 11/1990 | Maney et al. | 235/375 |
| 5,030,807 | 7/1991 | Landt et al. | 235/375 |
| 5,051,565 | 9/1991 | Wolfram | 235/384 |
| 5,117,096 | 5/1992 | Bauer et al. | 235/375 |
| 5,153,842 | 10/1992 | Dlugos, Sr. et al. | 235/380 |
| 5,340,968 | 8/1994 | Watanabe et al. | 235/380 |

FOREIGN PATENT DOCUMENTS

| | | |
|---|---|---|
| 0048809 | 1/1991 | European Pat. Off. . |
| 2209304 | 6/1974 | France . |
| 61-203021 | 9/1986 | Japan . |
| 2237479 | 5/1991 | United Kingdom . |
| 2238210 | 5/1991 | United Kingdom . |

Primary Examiner—Donald Hajec
Assistant Examiner—Karl D. Frech
Attorney, Agent, or Firm—Cushman, Darby & Cushman

[57] ABSTRACT

A system for computer-managing information of baggage to be loaded in an aircraft. The system comprises a response circuit attached to the baggage and a reader disposed at a classification point of the baggage. The response circuit operates to input and store baggage information indicative of at least a flight name of the aircraft and the owner of the baggage and in response to a question electromagnetic wave, outputs a response electromagnetic wave containing the baggage information. The reader transmits the question electromagnetic wave to the response circuit means and receive the response electromagnetic wave from the response circuit, thereby reading out the baggage information so that the baggage can be classified in accordance with the read baggage information. Also included is a computer for inputting and storing the baggage information read by the reader and for inputting and storing information representative of the owner of the baggage, the computer performing a verification between the baggage owner and the baggage on the basis of the inputted baggage information and the inputted owner information.

3 Claims, 13 Drawing Sheets

5,478,991

AIRCRAFT BAGGAGE MANAGING SYSTEM UTILIZING A RESPONSE CIRCUIT PROVIDED ON A BAGGAGE TAG

This is a division of application Ser. No. 07/903,972, filed Jun. 26, 1992, now U.S. Pat. No. 5,313,052.

BACKGROUND OF THE INVENTION

The present invention relates to an aircraft baggage managing system for managing baggages to be loaded into an aircraft.

In general, when baggages not brought into the cabin of the aircraft, they are encased in a container and loaded into a storage compartment of the aircraft. Under such a situation, when a passenger has checked baggage in but then decides to not get on the aircraft, the specified baggage, once encased in the aircraft container, is required to be taken out from the aircraft. However, a conventional system does not have a function to sufficiently manage the baggage-loaded information, and hence difficulty is encountered in sorting out the baggage actually loaded into the aircraft.

SUMMARY OF THE INVENTION

It is therefore an object of the present invention to provide an aircraft baggage management system which is capable of automatically managing baggages to easily recognize the baggages loaded into the aircraft.

In accordance with the present invention, there is provided a tag indicative of the fact that a baggage to be loaded into an aircraft belongs to a passenger which boards the aircraft, the tag including transmitting and receiving means comprising an antenna, a modulating and demodulating section and a signal processing section, the signal processing section storing baggage information representative of at least an owner of the baggage to which the tag is attached, and the transmitting and receiving means delivering the baggage information to an external through a reception and transmission of an electromagnetic wave.

According to this invention, there is also provided an aircraft baggage managing system for computer-managing information of a baggage to be loaded in an aircraft, comprising: response circuit means attached to a tag for the baggage, the response circuit means storing the baggage information indicative of at least a flight name of the aircraft and an owner of the baggage to be loaded into the aircraft and further being responsive to a question electromagnetic wave to output as a response electromagnetic wave the baggage information; and reader means for transmitting the question electromagnetic wave to the response circuit means to read out the baggage information stored in the response circuit means through the response electromagnetic wave from the response circuit means when the baggage is encased in a container to be loaded into the aircraft, and for inputting the read baggage information in a computer.

Further, according to this invention, there is provided an aircraft baggage managing system for managing information of a baggage to be loaded in an aircraft, comprising: response circuit means attached to the baggage, the response circuit means operating to input and store the baggage information indicative of at least a flight name of the aircraft and the owner of the baggage and further being responsive to a question electromagnetic wave to output as a response electromagnetic wave the baggage information; and reader means for transmitting the question electromagnetic wave to the response circuit means to receive the response electromagnetic wave from the response circuit means to read out the baggage information on the basis of the received response electromagnetic wave so that the baggage is classified in accordance with the read baggage information.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
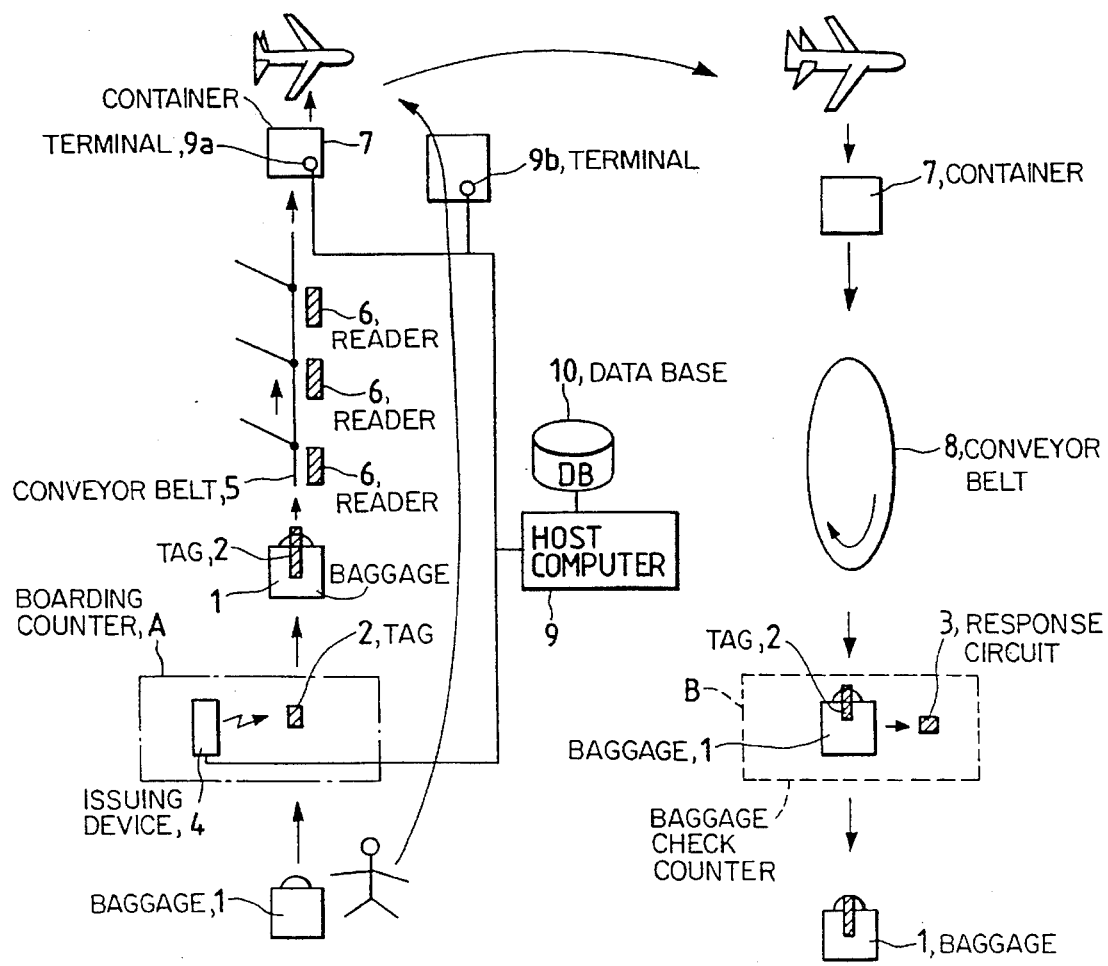
FIG. 1 is an illustration of a schematic arrangement of an aircraft baggage managing system according to an embodiment of the present invention.

An embodiment of the present invention will be described hereinbelow with reference to the drawings. FIG. 1 shows a conceptual arrangement of the embodiment of this invention. First the baggage information such as the flight name, date and ID number (which is the number indicative of the baggage owner and which is registered together with the passenger in a host computer) is inputted into a response circuit 3 contained within tag 2. An issuing device issues tag 2 in accordance with the boarding ticket received at a boarding counter A. The information corresponding to the baggage information is written on the surface of the tag 2. After the baggage stub is handed to the passenger, tag 2 is attached to baggage 1 which is then conveyed through a belt conveyer 5, with the tag acting as a classifying device. At each of the classifying points of the belt conveyer 5, a reader 6 transmits a question electromagnetic wave to the response circuit 3 contained within the tag, which in turn transmits an answering electromagnetic wave to the reader 6, whereby the information recorded in the response circuit 3 is provided to the reader 6. On the basis of the response information, the baggage 1 is classified in connection with the aircraft into which the baggage 1 is loaded. This classification operation can proceed without stopping the belt conveyer 5. The classified baggage 1 is then encased in a container 7 and loaded into the target aircraft.

After the aircraft arrives at the target airport, the baggage 1 is taken out from the aircraft and then placed on a belt conveyer 8 so as to be conveyed toward the passenger. The passenger carries the private baggage up to a baggage check counter B. Here, the ID number written on tag 2 is checked against the baggage stub of the passenger and the baggage 1 is delivered to the passenger. At this time, the response circuit 3 in tag 2 is withdrawn in order to prevent the next classification operation from being impeded (due to interference).

Although a detailed illustration is not made, it can be seen that a plurality of containers 7 can also be prepared, where then a reader reads the information indicative of the aircraft and container into which the baggage 1 is loaded and encased, and the read information is inputted through a terminal 9a into a host computer 9 and recorded in a data base 10. When this occurs, the baggage information is also inputted through the issuing device 4 in the host computer 9, and when the passenger gets on the aircraft, the information is inputted through a terminal 9b in the host computer 9. The information recorded the data base 10 can then be used for the management of the baggage information, which will be described hereinafter.

Figure 2:
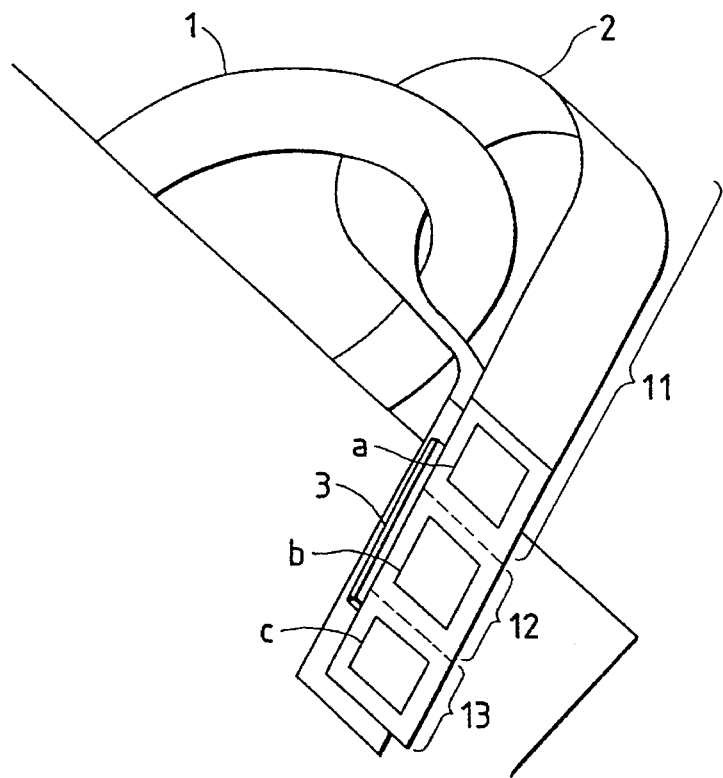
FIGS. 2 and 3 show an arrangement of a tag to be attached to a baggage to be loaded in an aircraft.
Figure 3:
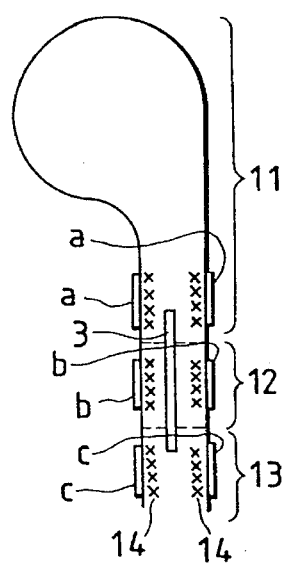

A description will now be made in terms of a detailed arrangement of this embodiment. First, an arrangement of the tag 2 will be described hereinbelow. FIG. 2 is a perspective view showing the state where tag 2 is attached to the baggage 1, and FIG. 3 is a cross-sectional side view showing a structure of the tag 2. In FIGS. 2 and 3, the tag 2 comprises three slips of paper: a main tag slip 11 attached to the baggage 1; a verification slip 12 for verifying the baggage owner; and a baggage slip (keeping slip) 13 delivered to the baggage owner. Additionally included is the response circuit 3 for storing the baggage information. The slips 11 to 13 have on both surfaces writing columns a, b and c, respectively. Further, between the respective slips 11 to 13 there are perforations or the like so the slips 11 to 13 are easily detachable from each other. In addition, the response circuit 3 is integrally fixed by adhesives 14 provided between the paired slips 11 to 13 of the tag 2. The baggage slip 13 is cut away from the tag 2 and handed to the baggage owner.

Figure 4:
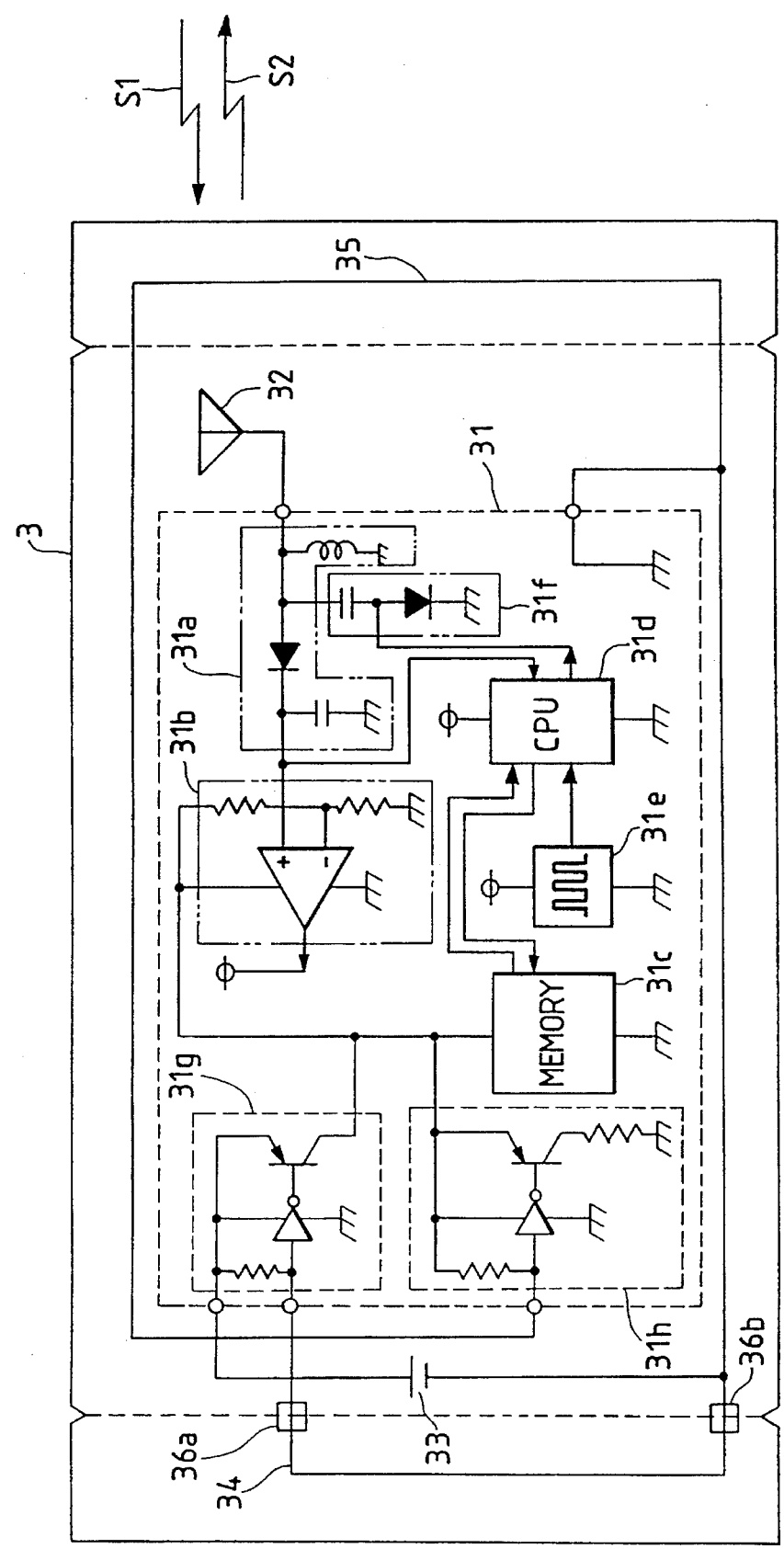
FIG. 4 is a circuit diagram showing an arrangement of a response circuit attached to a baggage tag.

A description will now be made hereinbelow in terms of the response circuit 3. FIG. 4 shows a detailed arrangement of the response circuit 3. In FIG. 4, the response circuit 3 comprises an IC chip 31 for performing the internal signal processing, an antenna 32 for receiving a question electromagnetic wave S1 and transmitting a response electromagnetic wave S2, a battery 33 for driving the IC chip 31, an operation starting line 34 for stopping the operation of the response circuit 3 before the circuit is used, and an operation ending line 35 for ending the operation of the response circuit 3 after the circuit is used. The operation starting line 34 is provided within the baggage slip 13 and the operation ending line 35 is provided within the main tag slip 11. Further, the IC chip 31 comprises a detector 31a for deriving the information included in the question electromagnetic wave S1 received through the antenna 32, a level comparator 31b for deciding the reception of the question electromagnetic wave S1 on the basis of the level of the signal from the detector 31a so as to supply power to the circuits, a memory 31c for storing the baggage information, a CPU 31d performing the transmission operation on the basis of the baggage information stored in the memory 31c, a clock generator 31e for generating a clock signal for the operation of the CPU 31d, a modulator 31f for modulating the question electromagnetic wave S1 on the basis of the output signal of the CPU so as to transmit the response electromagnetic wave S2 through the antenna 32.

To use the response circuit 3, punched holes 36a and 36b are formed by a punching device 44 (FIG. 7) when the baggage information is written by the issuing device 4 which will be described hereinafter. With this formation of the punched holes 36a and 36b, the operation start line 34 is cut off, thereby activating a drive circuit 31g which activates the response circuit 3. Further, when the baggage information is written by the issuing device 4 at the boarding counter A, a writing command and the baggage information are given with respect to the first transmission signal from the issuing device 4, and the CPU 31d decides the writing of the baggage information in response to the reception of the writing command so that the baggage information is written in the memory 31c. The memory 31c is arranged to be operable immediately before the writing operation of the response circuit 3 so as to be maintained by the battery 33. After the baggage information is written in the memory 31c, and when the antenna 32 receives the question electromagnetic wave S1, the level comparator 31b starts its power supply operation in response to the reception signal thereby supplying power to portions of the response circuit 3. The CPU 31d modulates the question electromagnetic wave S1 in accordance with the baggage information stored in the memory 31c so as to transmit the response electromagnetic wave S2 through the antenna 32.

Here, when the verification slip 12 is cut off after the use of the tag 2, the operation ending line 35 provided within the main tag slip 11 is taken out, thereby activating a discharging circuit 31h which operates to discharge the power remaining in the battery 33.

Figure 5A:
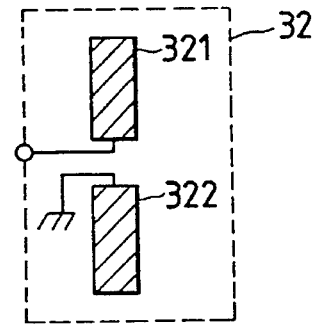
FIGS. 5A and 5B show different arrangement of an antenna constructed in the response circuit.
Figure 5B:
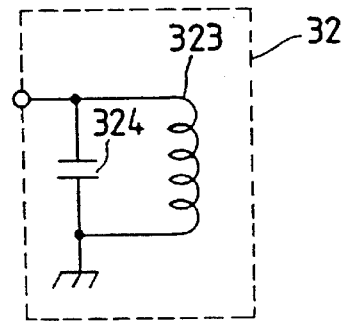

Several variations of the antenna 32 can be used as illustrated in FIG. 5A or 5B. FIG. 5A shows a dipole antenna comprising two antenna elements 321 and 322, and FIG. 5B shows a coil antenna comprising a coil 323 and a capacitor 324. Here, although in this embodiment the modulation and demodulation are effected with one antenna, it is appropriate to use two or more antennas which are respectively for the modulation and the demodulation. Since each of the aforementioned two antennas has both a front and back directivity, it is possible to read out the information in the response circuit 3 from both front and back sides of the tag 2, whereby assuring that the baggage information can be read out irrespective of the direction of the tag 2 attached to the baggage 1 during the operation of the belt conveyer. Further, it can be appropriate to use a different antenna, such as a slot antenna, if they have directivities at its front and back sides. Moreover, it is also appropriate to use the same two antennas, such as microstrip patch antennas so that the two antennas are coupled to each other and disposed in a manner so as to be directed to both the front and back sides thereof.

Figure 6:
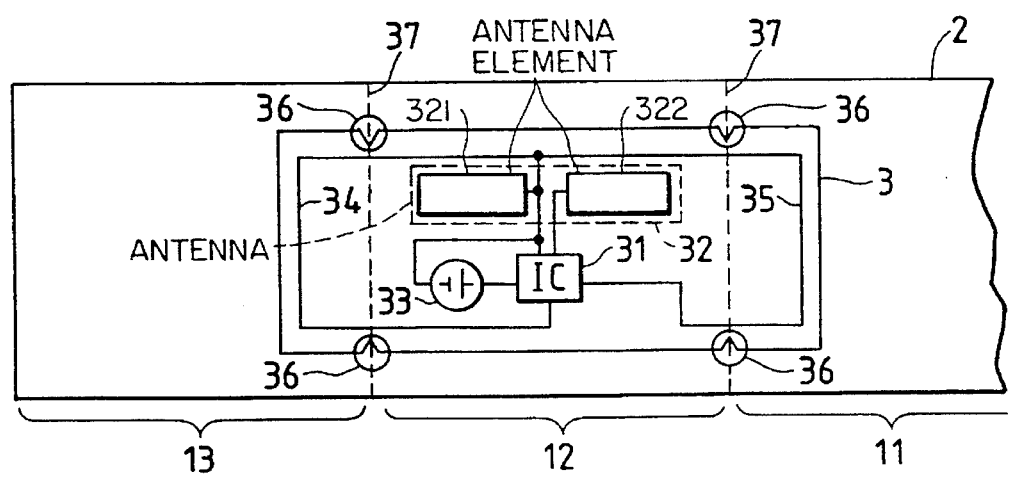
FIG. 6 illustrates the state that the response circuit is attached to a baggage tag.

FIG. 6 shows the structure where the response circuit 3 is actually attached to the tag 2. In FIG. 6, the response circuit 3 spreads over the three slips: the main tag slip 11, the verification slip 12 and the baggage slip 13. For making easy separation of the main tag slip 11 and the baggage slip 13 from the verification slip 12, a material such as polyester and paper, which can easily be cut, is used as a substrate material of the response circuit 3, and further cuts 36, along with are respectively made in the response circuit 36 and perforations 37 formed in the tag 2. Here, the cut 36 is for easy cutting, and hence it is also appropriate form fine notches at the circumferential portion of the response circuit 3 in place of the formation of the cuts 36.

Figure 7:
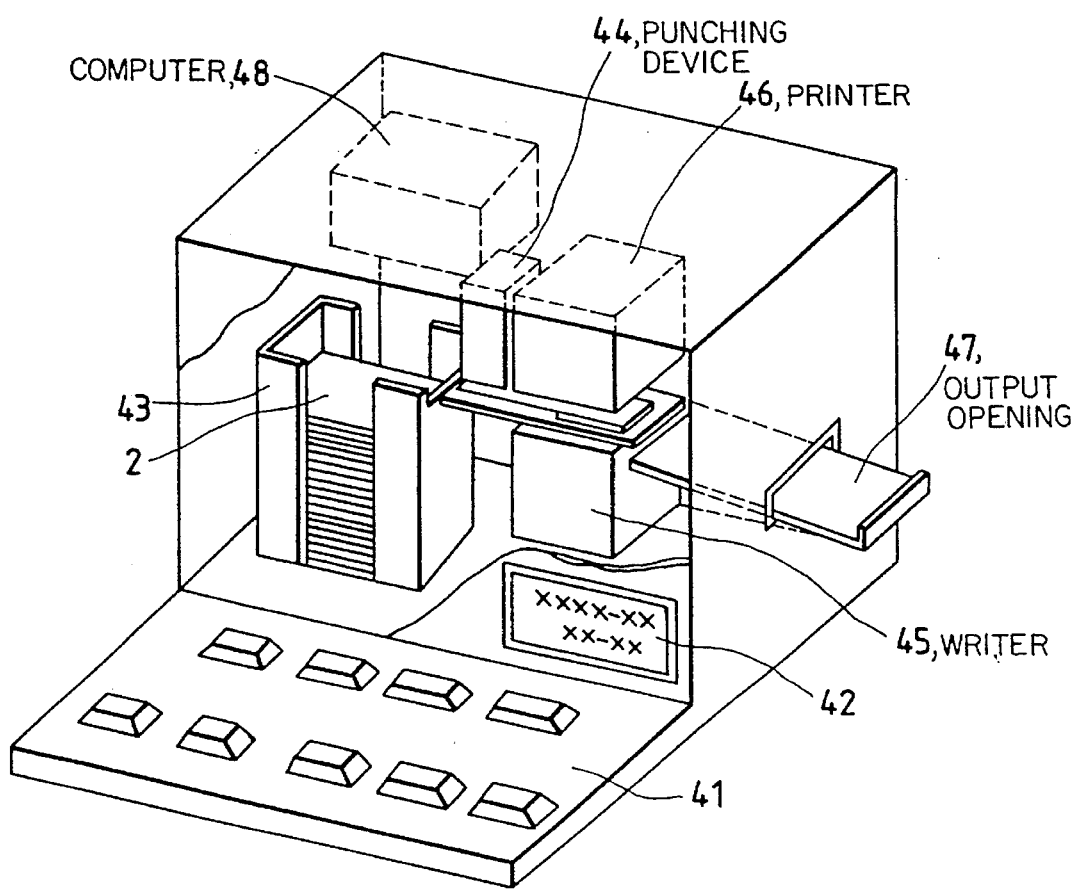
FIG. 7 is an illustration of an arrangement of a tag issuing device.

Further, a description will be made hereinbelow with reference to FIG. 7 in terms of an arrangement of the issuing device for writing the baggage information in the response circuit 3 when issuing the tag 2. In FIG. 7, the issuing device 4 is equipped with a keyboard 41 to input the baggage information. When the baggage information is inputted through the keyboard 41 in accordance with the information stated in the boarding ticket, the baggage information is displayed on a display 42 and an operation is made for the verification of its contents, before the baggage information is supplied to the host computer 9, the writer 45 and printer, which will be described hereinbelow.

In the main portion of the issuing device 4 there is provided a holder 43 for holding non-written tags 2. The non-written tags 2 are taken out one by one from the holder 43 and the punched holes 36a and 36b are formed at predetermined portions of the tag 2 by the pinching device 44 in order to cut the operation starting line 34 of the tag 2. Thereafter, the baggage information is inputted through the keyboard 41 in a computer 48, and a writer 45 is operated under control of the computer 48 to write the baggage information in the response circuit 3. A printer 46 also is operated to print the baggage information on the surface of the tag 2. In response to the completion of the writing operation, the tag 2 is delivered by an output opening 47. Here, all the necessary controls are effected by the computer 48. Further, it is not required that the writer 45 and printer 46 perform simultaneously.

Figure 8:
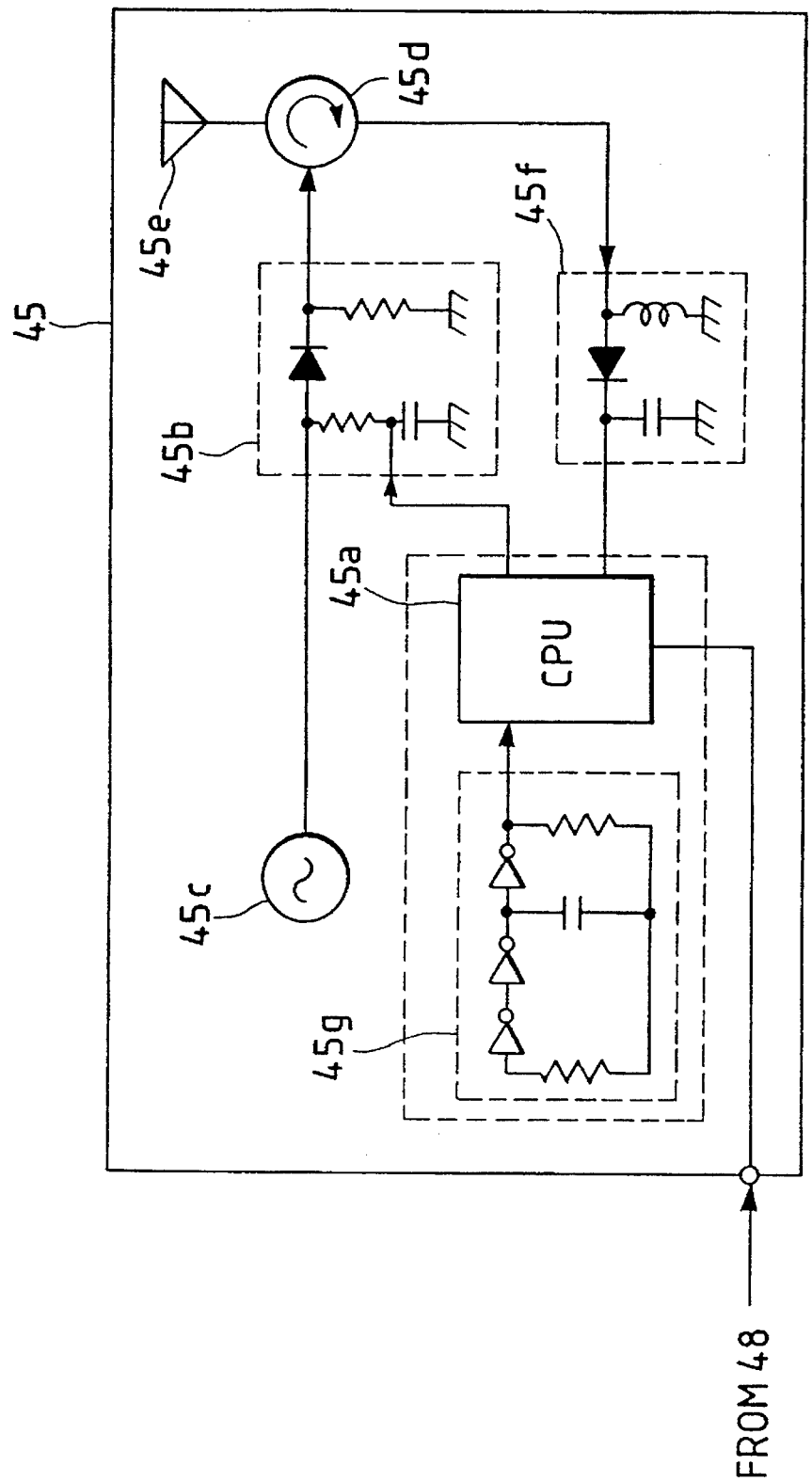
FIG. 8 is an illustration of an arrangement of a writer for writing baggage information in the response circuit.

FIG. 8 shows a detailed arrangement of the writer 45. In FIG. 8, the baggage information supplied from the computer 48 is inputted in the CPU 45a. The CPU 45a causes a modulator 45b to modulate a carrier wave from a carrier generator 45c in accordance with the inputted baggage information. This modulated signal is supplied through a circulator 45d to an antenna 45e so as to be transmitted as a transmission signal from the antenna 45e to the response circuit 3 of the tag 2. In response to the transmission signal, the response circuit 3 stores the baggage information in the memory 31c and then supplies a confirmation signal to the writer 45 after the completion of the storing operation. This confirmation signal is supplied through the antenna 45e and the circulator 45d to a demodulator 45f to be demodulated and further supplied to the CPU 45a. When detecting the reception thereof, the CPU 45a ends the writing operation with respect to the response circuit 3. Here, the reference 45g represents a clock generator for supplying clocks to the CPU 45a for their operation.

The tag 2 issued by the aforementioned issuing device 4 is attached to the baggage 1 and automatically classified after the baggage slip 13 is handed to the passenger.

Figure 9:
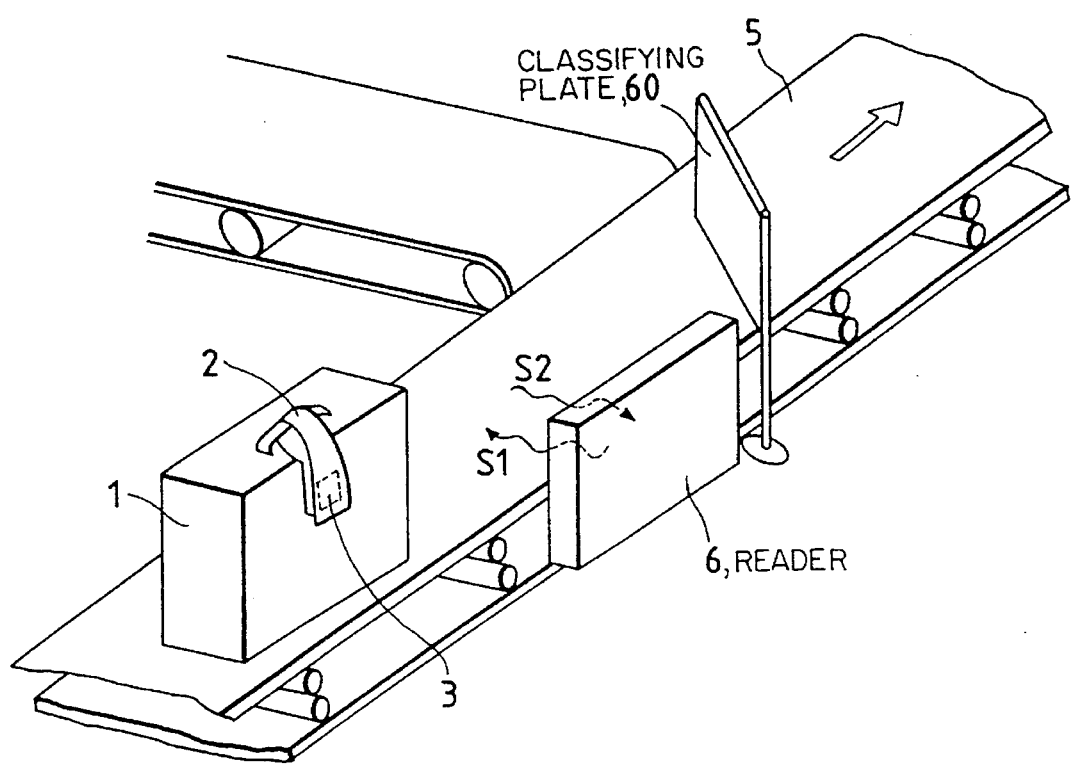
FIG. 9 shows an arrangement of a classification device for classifying a baggage to which a tag is attached.

In addition, a description will be made hereinbelow in terms of an arrangement for automatically classify the baggage, having the aforementioned tag 2, through the belt conveyer 5. In FIG. 9, the reader 6 transmits the question electromagnetic wave S1 in relation to the tag 2 of the baggage 1 and then inputs the response electromagnetic wave S2 from the response circuit 3 of the tag 2. The reader 6 reads the baggage information on the basis of the response electromagnetic wave S2 and, if satisfying the classification condition, rotationally drives a classifying plate 60 to discharge the baggage 1 from the belt conveyer 5. With this classifying operation being effected at every classifying point of the belt conveyer 5, it is possible to automatically transport the baggage 1 to the corresponding aircraft.

Figure 10:
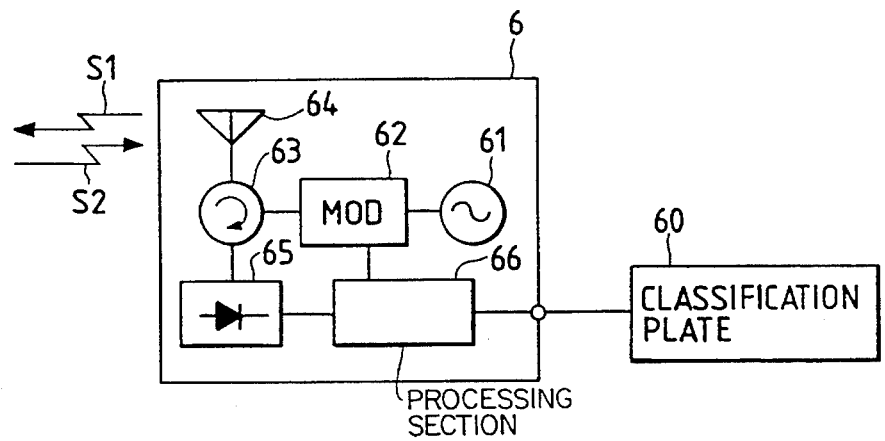
FIG. 10 shows an arrangement of a reader for reading the baggage information from the response circuit.

FIG. 10 shows a detailed arrangement of the reader 6, which comprises an oscillator 61 for generating a transmission carrier wave, a modulator (MOD) 62 for producing the question wave, S1 by modulating the carrier wave if required, a circulator 63 for performing the separation between the transmission wave and the reception wave, a transmission and reception antenna 64 for transmitting the question wave S1 and for receiving the response wave S2, a demodulator 65 for demodulating the received response wave S2, and a processing section 66 for controlling the modulator 62 in accordance with the information from the demodulator 65 and further for deciding whether the baggage 1 satisfies the classification condition on the basis of the demodulated information so as to drive the classification plate 60. Here, the detailed arrangement shown in FIG. 10 is similar to the arrangement shown in FIG. 8.

Figure 11:
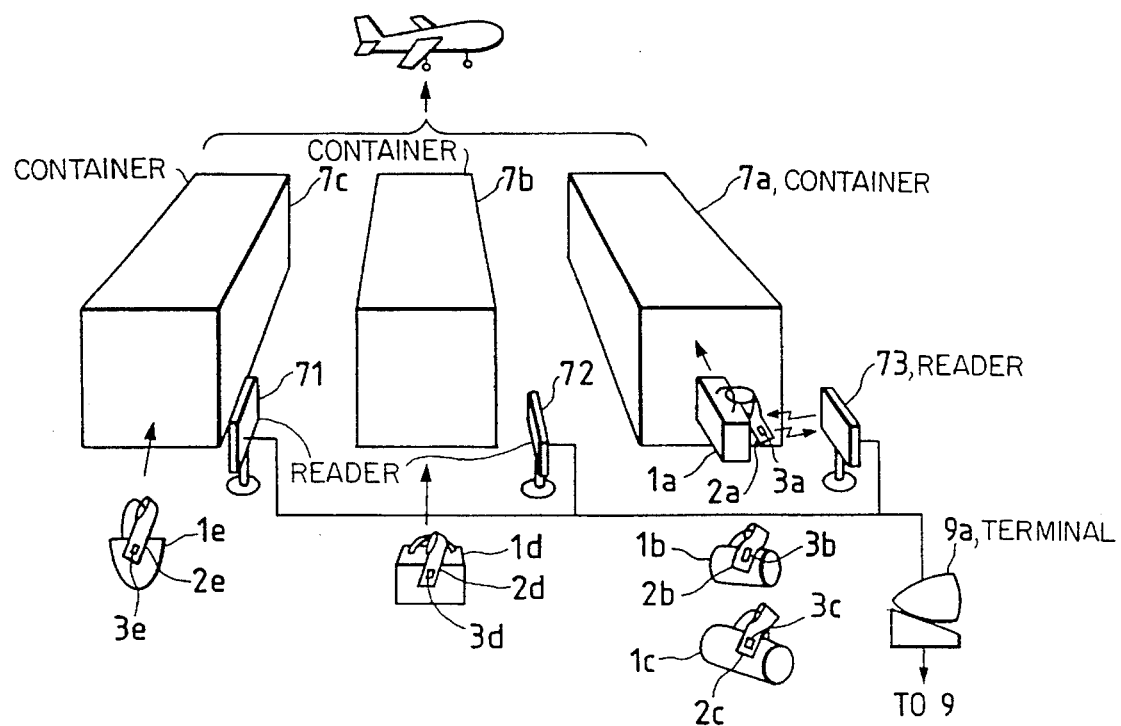
FIG. 11 shows a reading arrangement for reading the baggage information when the baggages are encased in a plurality of containers to be loaded into a corresponding aircraft.

After the completion of the automatic classification, the baggage 1 is encased in the container 7. FIG. 11 shows the state that each of 5 baggages 1a to 1e respectively having tags 2a to 2e are encased into either of three aircraft containers 7a to 7c which are loaded into the same aircraft. Three readers 71 to 73 are respectively disposed in front of the respective containers 7a to 7c so as to read the baggage information recorded in the response circuits 3a to 3e of the tags 2a to 2e attached to the baggages 1a to 1e (the arrangement of each of the readers 71 to 73 is basically similar to the arrangement shown in FIG. 10 except for the arrangement of the processing section 66 which transmits the demodulated information to the terminal 9a). The baggage information is supplied through the terminal 9a to the host computer 9 and the encasing information is stored in the data base 10.

Figure 12:
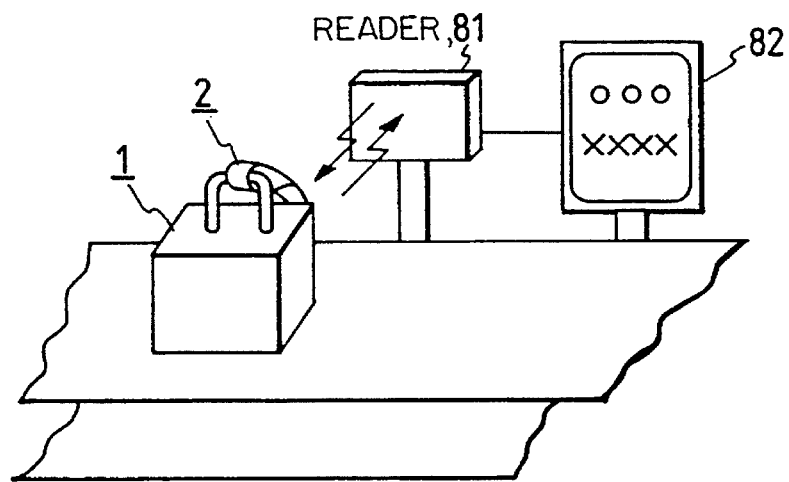
FIG. 12 shows a reading arrangement for reading the baggage information when the baggage is delivered to the baggage owner.

After the aircraft arrives at the destination, the baggages 1 are delivered through the belt conveyer 8 toward the passengers. Here, as illustrated in FIG. 12, a reader 81 reads the baggage information from the response circuit 3 of the tag 2 and then displays the ID :number (and/or the name of the owner obtained from ID number) and other information on a display 82, whereby the passenger can check, in accordance with the display information, whether the baggage 1 is his or her own.

Further, at the tag check counter B, the verification slip 12 of the three tag slips is taken off from the main tag slip 11 and collected when the baggage 1 is handed to the owner. Thus, since the response circuit 3 is built in the verification slip 12 of the tag 2, the collection thereof becomes easy. In addition, since the verification slip 12 is taken off after the use of the tag 2, which cuts off the operation ending line 35 from the IC chip 31, the remaining power of the battery 33 is discharged, thereby preventing the malfunction of the system, after its use.

Figure 13:
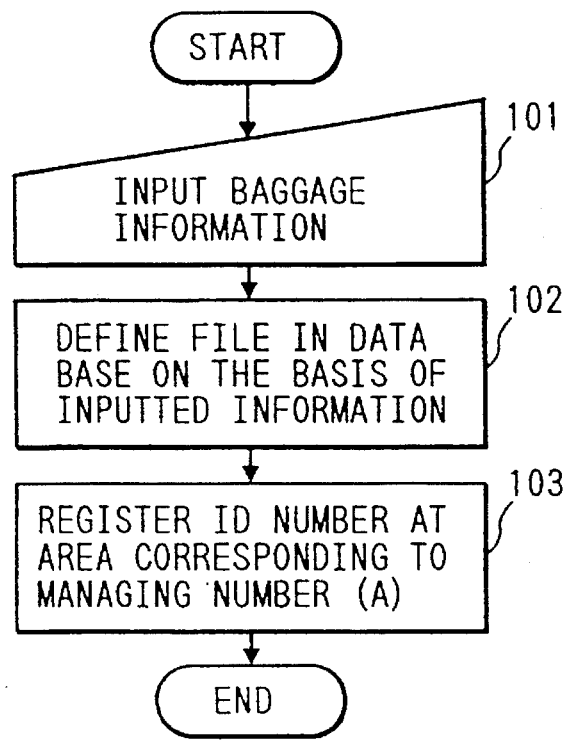
FIG. 13 is a flow chart showing an operation to be executed for registering the baggage information when the tag is issued.

A description will be made hereinbelow in terms of the management of the baggage information by the host computer 9. First, a registration operation of the baggage information from the issuing device 4 for issuing the tag 2 will be described. In FIG. 13, the operation starts with a step 101 to input the baggage information from the issuing device 4 through the terminal, then followed by a step 102 to define a file of the data base 10 in accordance with the boarding flight name and date of the baggage information. Further, a step 103 follows to register the ID number in a storing area of the file corresponding to a baggage managing number (A) taken in order of issue. Accordingly, with the aforementioned operation being effected with every issue of the boarding pass, the ID number of the passenger is registered in the file corresponding to the boarding flight name and data in order of the baggage managing number (A).

Figure 14:
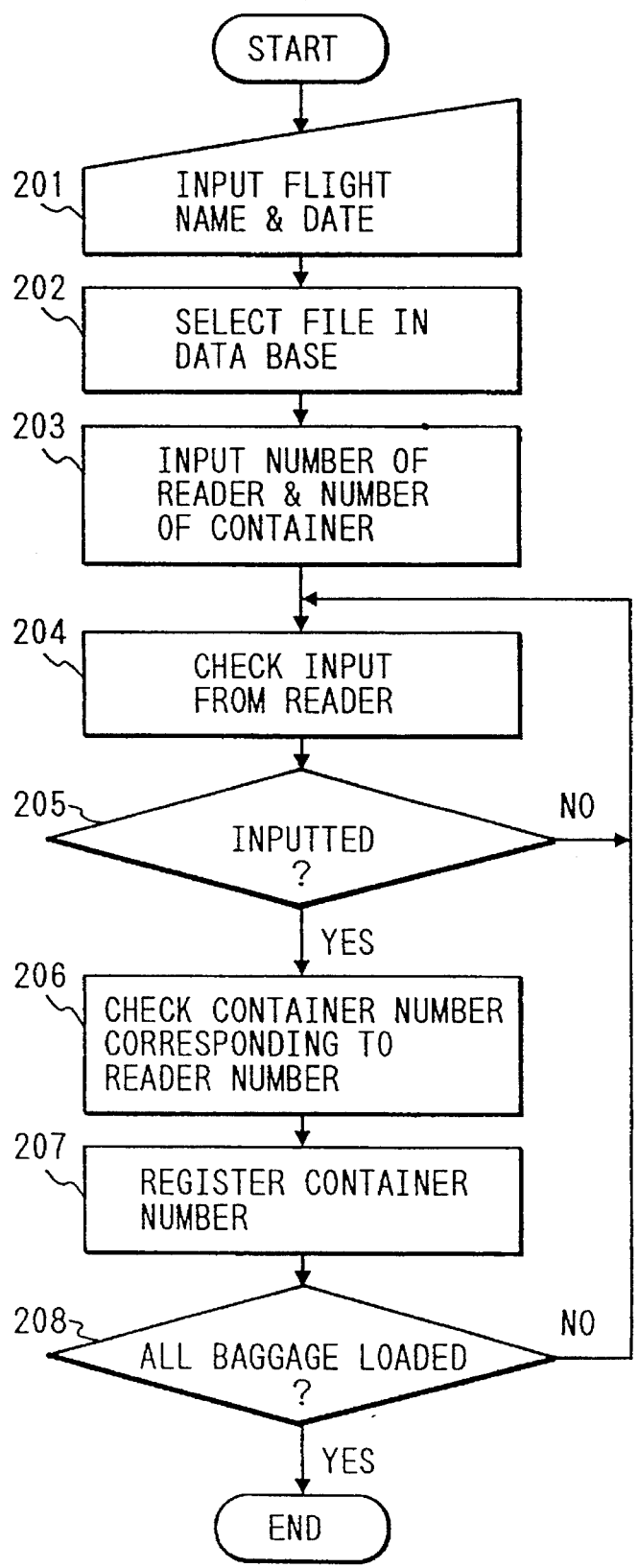
FIG. 14 is a flow chart showing an operation to be executed for registering the baggage information when the baggage is encased in a container.

Secondly, a description will be made hereinbelow in terms of a registration operation at the time of the encasing into the container. In FIG. 14, this operation starts with a step 201 to input through the terminal 9a the date and the flight name of the aircraft into which the container is loaded, then followed by a step 202 to select a file in the data base 10 on the basis of the input data. Further, a step 203 follows to input the number of a reader coupled to the terminal 9a and the number of a container for which the reader is placed. After the execution of these initial processes, the following operation is effected. That is, a step 204 first follows to check an input from either of the readers. If not receiving the input, the decision of a step 205 is "NO", whereby the step 204 is repeatedly performed. On the other hand, if the input from the reader occurs, the operational flow advances to a step 206 to check the number of the container corresponding to the number of the reader which generates the input and further advances to a step 207 to register the container number at the storing area of the file in the data base 10 which corresponds to the ID number of the read baggage information. This operation continues until all the scheduled baggages are loaded (step 208). Accordingly, with this operation, the number of the container in which the baggage will be loaded in the aircraft, together with the ID number of the baggage, is registered in the file of the data base 10.

Figure 15:
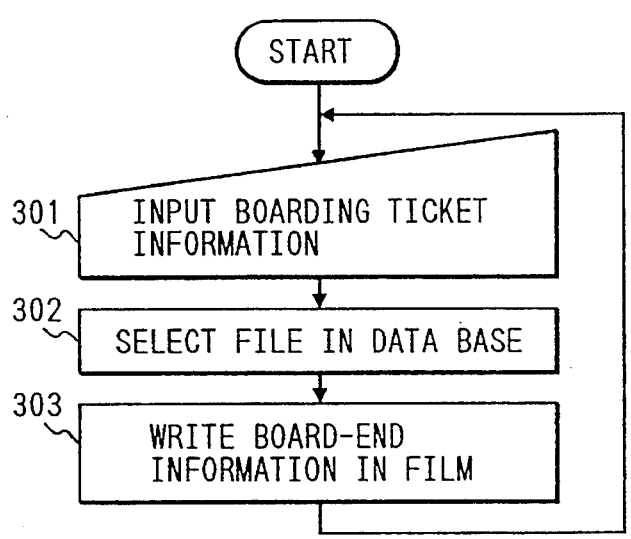
FIG. 15 is a flow chart showing an operation to be executed when a passenger boards an aircraft.

Further, a description will be made hereinbelow in terms of a registration operation effected: when the passenger gets on the corresponding aircraft. At a passenger loading gate there is provided the terminal 9b which is for inputting the boarding flight name, date and ID number on the basis of the boarding ticket of the passenger. In FIG. 15, the host computer 9 executes a step 301 to input the boarding ticket information from the terminal 9b and executes a step 302 to select the file of the data base on the basis of the inputted flight name and data and further executes a step 303 to write the boarding information (indicative of the fact that the boarding has been made) at the storing area of the file corresponding to the ID number. Thus, the boarding information is written to the file so as to correspond with the ID number of the passenger.

Figure 16:
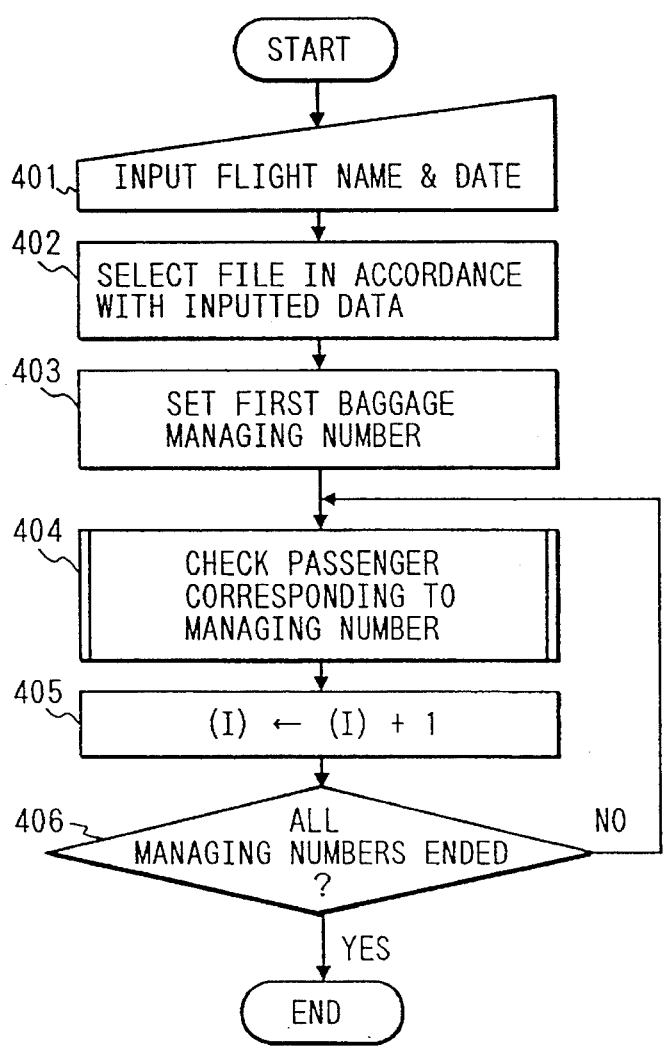
FIG. 16 is a flow chart showing an checking operation between a passenger and a baggage.

The verification between the passenger and the baggage is made in accordance with the above-described various registration information. This operation will be described hereinbelow with reference to FIG. 16. In FIG. 16, a step 401 is first executed in order to input the aircraft flight name and date to be checked, then followed by a step 402 to select the corresponding file in accordance with the inputted data, thereafter performing the baggage check operation. That is, the first number of the baggage managing numbers (I) is set in a step 403 and the boarding of the passenger corresponding to the baggage managing number is checked in a baggage check routine 404. This check operation is effected through steps 405 and 406 with respect to all the baggage managing numbers.

Figure 17:
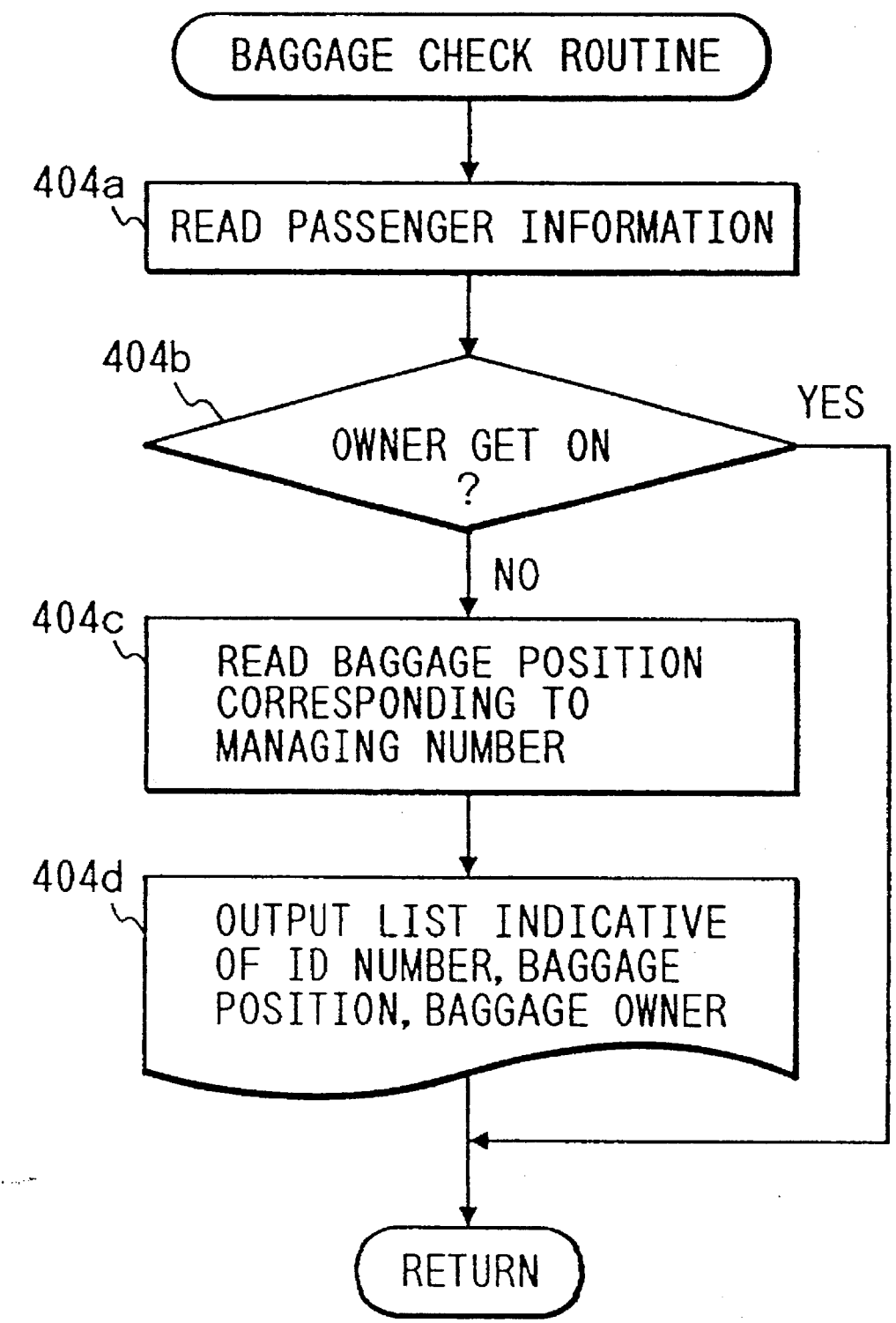
FIG. 17 is a flow chart showing a detailed operation to be executed in a baggage check routine.

FIG. 17 shows a detailed operation of the aforementioned baggage check routine 404. A step 404a is first executed to read the passenger information from the storing area corresponding to the baggage managing number in the file. Step 404b is then executed to check whether or not the baggage owner boards the aircraft. If the passenger does not get on, that is, if the answer of the step 404b is "NO", a step 404c follows to read the container number stored in correspondence with the managing number and a step 404d further follows to output a list indicative of the ID numbers of the baggage and the number of the container encasing the baggage to be taken out. Accordingly, by checking the ID number of the baggage encased in the container corresponding to the container number in accordance with the outputted list, it is possible to take out the baggage belonging to the person which does not get on.

Here, if the information indicative of container in which the baggage is encased is additionally registered in the data base when the baggage is encased in the container, it is possible to roughly confirm the loaded position of the specific baggage in the container.

Figure 18:
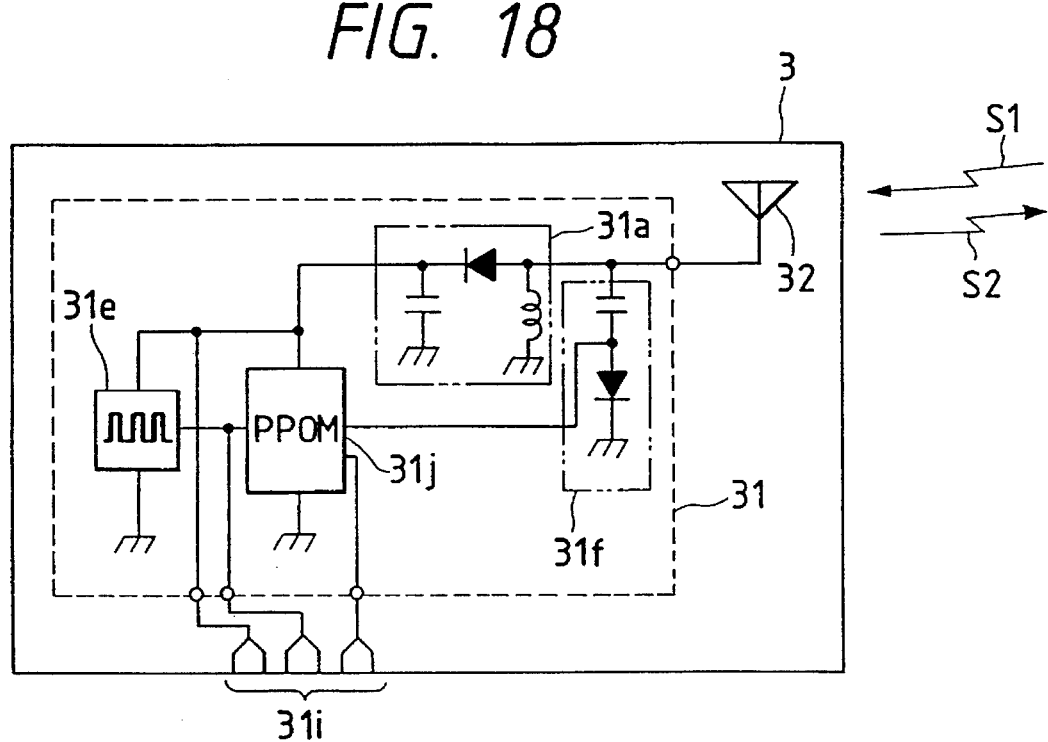
FIG. 18 is a circuit diagram showing a different arrangement of the response circuit.

A description will be made hereinbelow in terms of a different arrangement of the response circuit 3. FIG. 18 shows a response circuit 3 arranged such that the drive power is obtained from the question electromagnetic wave S1. Since this response circuit 3 is not equipped with a battery, unlike the above-described response circuit 3, the particular circuit for suppressing the consumption of the battery or effecting the consumption of the remaining power within the battery is not required.

In FIG. 18, the response circuit 3 comprises an antenna 32 for receiving the question electromagnetic wave S1 and for transmitting the response electromagnetic wave S2, an IC chip 31 for performing the internal processing, and a writing terminal 31i for writing the baggage information in an internal memory. Further, the IC chip 31 has a writable non-volatile memory PROM 31j which can keep the baggage information even when a power is not supplied thereto. For writing the baggage information in the response circuit 3, a write signal or data is supplied from a writer through the writing terminal 31i thereto so that the baggage information is directly ,written in the PROM 31j. At this time, the terminal of the PROM 31j is directly controllable and hence it is not required to provide a special circuit or a CPU within the IC chip 31. Further, for reading the written information, the antenna 32 receives the question electromagnetic wave S1 from a reader and most of the reception signal is rectified by a detector 31a so as to be used as a direct-current power source for driving the circuits. Thus, a clock generator 31e and the PROM 31j within the IC chip 31 are driven to produce the response electromagnetic wave including the contents of the PROM 31j which is in turn transmitted through a modulator 31f toward the reader.

Figure 19:
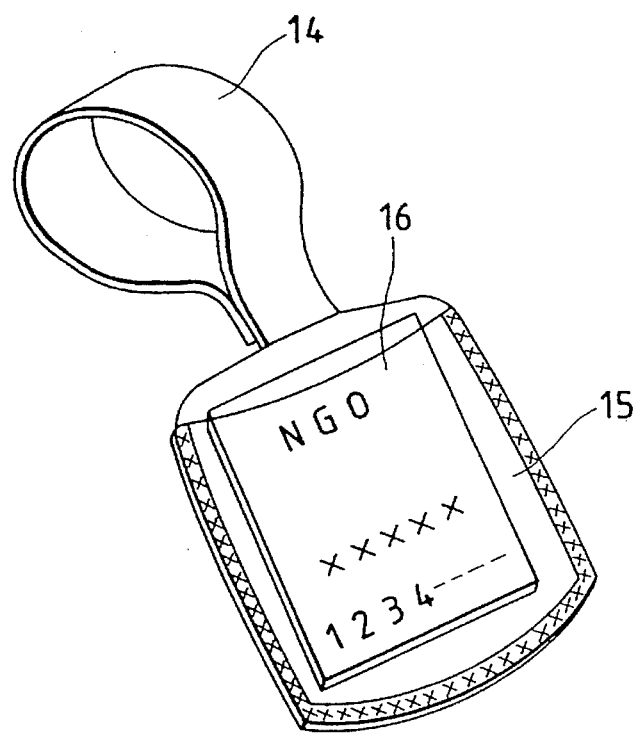
FIG. 19 shows a different arrangement of the tag.

According to this arrangement, the circuit is not cut at the time of the circuit's use and the entire circuit is withdrawn together with the verification slip 12, and hence is easily reusable. In addition, it is possible to increase the degree of freedom when attaching the response circuit 3 to the tag 2, and hence it is also possible to arrange the tag 2 as illustrated in FIG. 19. That is, the tag 2 comprises an attaching portion 14 for coupling the tag 2 to the baggage 1, a pocket 15 and a tag slip 16 encased in the pocket 15, with the tag slip 16 comprises a printed seal having a surface to which the response circuit 3 is adhered. Here, the response circuit 3 and the printed seal are adhered to each other by an adhesion whose degree is arranged to allow easy separation therebetween to permit its reuse. On the printed seal there is printed the information corresponding to baggage information stored in the response circuit 3.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although the above-described embodiment relates to the computer management for the verification between the passenger and the baggage, it is appropriate that this invention is applied to a baggage tracing system operated in case that one baggage is not loaded into a given aircraft.

What is claimed is:

1. A tag indicating that baggage to be loaded into an aircraft belongs to a passenger boarding said aircraft, said tag including:

transmitting and receiving means comprising an antenna, a modulating and demodulating section and a signal processing section, said signal processing section storing baggage information representing at least an owner of said baggage to which said tag is attached, said transmitting and receiving means delivering said baggage information to an external element using said modulating and demodulating section and said antenna;

a main tag slip;

a verification slip for verifying said baggage and said owner of said baggage; and a keeping slip to be delivered to said owner of said baggage, wherein a portion of said transmitting and receiving means is encased in said main tag slip and a remaining portion thereof is encased in said verification slip, and after said baggage and said owner are verified using said verification slip, said verification slip is removed from said tag to prevent further transmission and reception of said electromagnetic wave.

2. A tag as claimed in claim 1, wherein said transmitting and receiving means comprises power supply means for supplying power to said signal processing section and discharging means for discharging power within said power supply means, where said discharging means starts to discharge said power within said power supply means when said verification slip is cut off from said tag after the completion of said verification due to said verification slip.

3. A tag indicating that baggage to be loaded into an aircraft belongs to a passenger boarding said aircraft, said tag including:

transmitting and receiving means comprising an antenna, a modulating and demodulating section and a signal processing section, said signal processing section storing baggage information representing at least an owner of said baggage to which said tag is attached, said transmitting and receiving means delivering said baggage information to an external element using said modulating and demodulating section and said antenna, said transmitting and receiving means further comprising power supply means for supplying power to said signal processing section and supply starting means for starting a supply of power using said power supply means;

a main tag slip;

a verification slip for verifying said baggage and said owner of said baggage; and a keeping slip to be delivered to said owner of said baggage, said supply starting means starting said supply of power when said keeping slip is removed from said tag.

* * * * *